(12) United States Patent
Garcia

(10) Patent No.: US 6,687,292 B1
(45) Date of Patent: Feb. 3, 2004

(54) TIMING PHASE ACQUISITION METHOD AND DEVICE FOR TELECOMMUNICATIONS SYSTEMS

(75) Inventor: Domingo G. Garcia, Plano, TX (US)

(73) Assignee: Texas Instruments Incorporated, Dallas, TX (US)

(*) Notice: Subject to any disclaimer, the term of this patent is extended or adjusted under 35 U.S.C. 154(b) by 660 days.

(21) Appl. No.: 09/713,409

(22) Filed: Nov. 15, 2000

Related U.S. Application Data
(60) Provisional application No. 60/171,344, filed on Dec. 21, 1999.

(51) Int. Cl.[7] .............. H03H 7/30; H03H 7/40; H03K 5/159
(52) U.S. Cl. .................. 375/235; 375/231; 375/234
(58) Field of Search ........................ 375/229–235; 708/322, 323; 333/28 R

(56) References Cited

U.S. PATENT DOCUMENTS

| | | | | |
|---|---|---|---|---|
| 3,727,136 A | * | 4/1973 | Schroeder et al. | 375/235 |
| 3,755,738 A | * | 8/1973 | Gitlin et al. | 375/235 |
| 3,962,637 A | * | 6/1976 | Motley et al. | 375/232 |
| 3,969,674 A | * | 7/1976 | Tracey | 375/235 |
| 5,222,101 A | * | 6/1993 | Ariyavisitakul et al. | 375/231 |
| 5,297,165 A | * | 3/1994 | Ueda et al. | 375/230 |
| 5,930,309 A | * | 7/1999 | Knutson et al. | 375/340 |
| 6,522,702 B1 | * | 2/2003 | Maruyama | 375/324 |

* cited by examiner

*Primary Examiner*—Phoung Phu
(74) *Attorney, Agent, or Firm*—Robert D. Marshall, Jr.; W. James Brady, III; Frederick J. Telecky, Jr.

(57) ABSTRACT

A timing phase acquisition method and device for burst modems includes an receiver designed to initialize an equalizer filter by matching clock of the equalizer filter of the receiver with the phase of the received signal.

5 Claims, 2 Drawing Sheets

TIMING PHASE ACQUISITION METHOD AND DEVICE FOR TELECOMMUNICATIONS SYSTEMS

This application claims priority under 35 USC §119(e)(1) of Provisional Application No. 60/171,344, filed Dec. 21, 1999.

TECHNICAL FIELD OF THE INVENTION

This invention relates generally to the field of telecommunications and is more specifically related to burst modems and improvements therein.

BACKGROUND OF THE INVENTION

In recent years, the data rates at which communications may be carried out over conventional telephone networks and wiring has greatly increased. These increases are due, in large part, to newly adopted techniques of multiplexing and modulating signals representative of the messages or data being communicated, resulting in greatly improved communication bandwidth. In addition, the carrier frequencies at which such communications are being carried out have also increased in recent years, further improving the bit rate.

In general, the local oscillator frequencies used in a transmitting modem and a receiving modem are not identical. The frequencies of their clocks can be off by as much as 100 ppm. One of the tasks of the receiving modem is to generate a signal that allows it to sample the output of the receiver portion of the modem at the best timing instant. The best timing instant gives the best estimate of the instant to sample the transmitted data. In doing so, the receiver must first acquire and then track the frequency drift of the transmitter's clock. This invention provides a novel method for the initial acquisition of the phase difference between the transmitted signal and the receiver, and is especially useful in burst modems such as those which are used in CAP/QAM modulation schemes.

Use of quadrature modulation is intended to increase the information-carrying capacity of a modulated signal. One such modulation is Quadrature Amplitude Modulation (QAM), described by Betts et al. in U.S. Pat. No. 5,859,877. QAM involves transmitting data as a sequence of two-dimensional complex signals, i.e. with both in-phase and quadrature components. Each symbol, is assigned a specific pre-defined value according to the data it represents. A set of all of the values available for transmission is termed a constellation, and so resembles a constellation when graphically plotted on a two-dimensional basis.

Another modulation scheme is Carrierless Amplitude Phase modulation (CAP). Receivers using CAP modulation are a bandwidth-efficient means for receiving modulated signals using two-dimensional pass band line code in which the symbol data is organized in I and Q pairs. Knutson et al, U.S. Pat. No. 5930,309, describes a receiver signal processing system for CAP signals. The I and Q data in such a system are filtered with orthogonal I and Q band pass filters having a common pass band. With CAP, processing is done in the pass band of the filters, which eliminates the need for a carrier tracking loop. However, tighter symbol timing constraints is required due to the frequencies of the pulses transmitted. CAP signals can resemble QAM signals except the transmitted data is not spinning or rotating at a carrier frequency.

There are several conventional ways to perform timing recovery in a CAP/QAM system. One method is to implement a phase lock loop (PLL) using a combination of analog and digital techniques as shown in FIG. 1. A Timing Phase Detector (TPD) 101 processes the incoming data samples, s[n], sampled from a signal S(t) by using an analog to digital converter (A/D) 104. One known method, which can perform the function of the TPD 101, is a Band Edge Component Maximization (BECM) process which generates an error signal that is proportional to the difference in phase between the transmitter and receiver clocks. The error signal generated by the TPD 101 is filtered (or averaged) and passed on to a digital to analog (D/A) converter 102. The D/A converter output is used to control the frequency of a voltage controlled oscillator (VCO) 103. The advantage of this approach is that the rest of the receiver does not need to comprehend the timing mismatches. It assumes that the incoming data stream has been sampled at the optimum instant. However, a disadvantage of this approach is the mixing of both analog and digital circuitry.

Another known method for performing timing recovery is an all digital implementation of a PLL as illustrated in FIG. 2. The receiver A/D converter is clocked by a free running oscillator 201. As in the first method, a Timing Phase Detector 101 is used to determine the phase error between the transmitter and receiver clocks according to the frequency of the free running oscillator 201. The error signal from the TPD 101 is then passed to an interpolator 202. The interpolator 202 generates optimally sampled data samples s*[n] based on the signal S(t) sampled by the fee running oscillator at a frequency regulated by the receiver clock. The interpolator 202 adds a fractional delay (less than 1 sample period delay) between the A/D converter and the rest of the receiver processing based on the error signal. The amount of delay is increased or decreased to correct for the transmitter clock drift measured by the TPD. A disadvantage of this method arises when a sample is to be inserted or deleted and the amount of delay required by the interpolator is more than one sample period to be inserted and less than one sample period to be deleted, respectively. As a consequence, when a sample must be inserted, for example the receiver has one sample period less time to process the signal and information may be lost.

Assuming that the equalizer has been converged to reflect the characteristics of the transmission medium, each time the modem is operated, the equalizer must be initialized to account for the phase difference between the signal and the frequency characteristic of the equalizers' initial state.

SUMMARY OF THE INVENTION

Accordingly, a need has arisen in the art for a method and apparatus to provide phase acquisition and initialization for burst modems.

In accordance with the present invention, a method and a device for determining timing phase of a digital signal and for initializing a receiver are provided.

An equalizer is provided for processing a digital signal received by the burst modem receiver. A filter buffer is provided for storing a set of equalizer coefficients to be applied to the equalizer. A buffer manager is provided for storing the coefficients of the equalizer and for performing the acquisition of the timing phase and initialization of the receiver.

The buffer manager is provided for detecting a burst message preamble of the digital, and choosing a desired symbol point from a known burst sequence. The buffer manager samples an output signal from an in-phase equalizer and a quadrature equalizer to form a subset of the preamble, and chooses a selected output pair from the subset.

The buffer manager calculates a desired angle of the desired symbol point and an output angle of the selected output pair, and compares the desired angle with the output angle to obtain an angle difference.

Implementation of a delay for the in-phase equalizer and quadrature equalizer can be provided by the buffer manager based on the angle difference.

Other technical advantages of the present invention will be readily apparent to one skilled in the art from the following figures, descriptions, and claims.

BRIEF DESCRIPTION OF THE DRAWINGS

For a more complete understanding of the present invention and its advantages thereof, reference is now made to the following description taken in conjunction with the accompanying drawing, wherein like reference numerals represent like parts, in which.

DETAILED DESCRIPTION OF THE INVENTION

Figure 1:
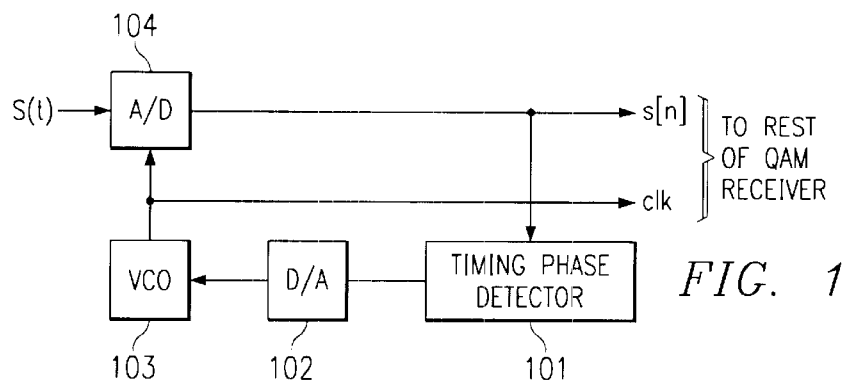
FIG. 1 is a block diagram of a known Phase Lock Loop.
Figure 2:
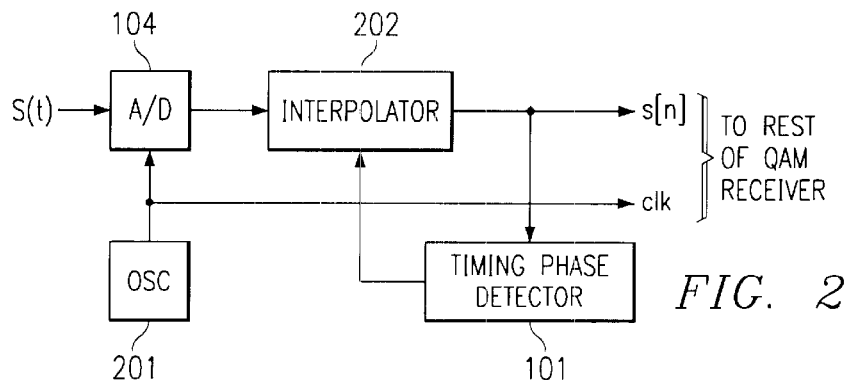
FIG. 2 is a block diagram of a known digitally implemented Phase Lock Loop.
Figure 3:
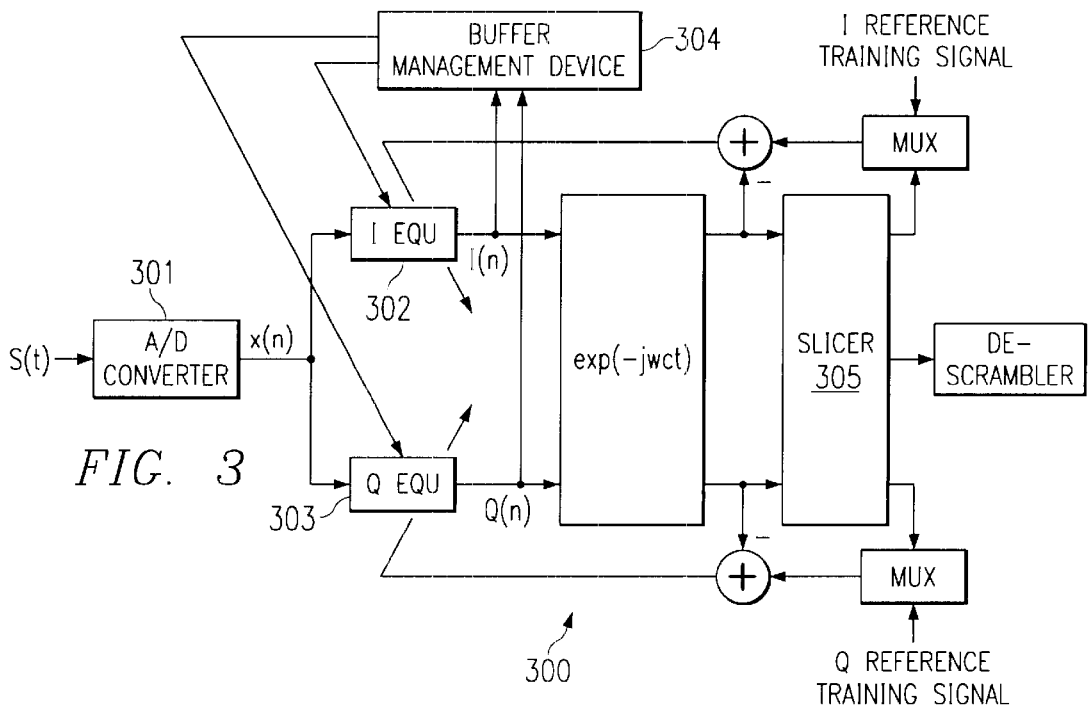
FIG. 3 is a block diagram of one embodiment of a timing phase acquisition and initialization device for a receiver according to the invention.

The proposed invention involves a method and device for acquiring the timing phase of a received signal. An embodiment of a receiver 300 according to the invention is illustrated in FIG. 3. The receiver 300 can be implemented solely through hard-coded electronics or can utilize a computer and software for the digital signal processing.

In a receiver 300 according to the invention, an analog signal s(t) can be digitized by an analog to digital (A/D) converter 301. The A/D converter can be incorporated into the receiver or can be implemented separately.

The processing of the digitized signal begins with two phase splitting filters implemented as linear adaptive fractionally spaced equalizers. A linear adaptive equalizer is simply a Finite Impulse Response (FIR) Filter with programmable filter coefficients. A fractionally spaced equalizer processes more than 1 A/D sample per QAM/CAP symbol period.

$$y(n) = \sum_{k=0}^{N-1} w[k]x[n-k],$$

where x[n] are the input samples, y(n) is the filtered output, and w[k] are the coefficients (also known as tap weights). In the QAM/CAP receiver, the equalizers comprise an in-phase equalizer 302 and a quadrature equalizer 303, which are implemented as $$I(n) = y(n) = \sum_{k=0}^{N-1} w[k]x[n-k] \text{ and}$$

-continued $$Q(n) = y(n) = \sum_{k=0}^{N-1} w_Q[k]x[n-k],$$

where x[n] are the input samples from the A/D converter 301 and $w_I[k]$ are the coefficients of the in-phase equalizer 302 and $w_Q[k]$ are the coefficients of the quadrature equalizer 303, and I(n) and Q(n) are the outputs of the in-phase equalizer 302, and quadrature equalizer 303, respectively. The coefficients for the two filters, which can be stored in a buffer management device 304 or in a separate memory device, define the impulse response of the equalizers. There is one set of coefficients for the in-phase equalizer and one set of coefficients for the quadrature equalizer. The particular characteristics of the channel being equalized determine the required length (N in the above equations) of the equalizer filters.

During the start up state of the receiver, the two equalizers are trained using a standard Least Means Square (LMS) algorithm using a known training sequence. Training an equalizer refers to the changing of the coefficients over some time period such that a criterion is satisfied. In this case, the minimization of the mean square error is the criterion. The LMS algorithm iteratively updates the filter coefficients using the following equations:

$$e(n)=d(n)-w^H(n)u(n), \text{ and}$$

$$w(n+1)=w(n)+\mu u(n)e^*(n),$$

where e*(n) is the complex conjugate of the estimation error, w(n) is the tap weight vector (i.e. the set of coefficients), w(n+1) is the updated coefficient set after one iteration, d(n) is the desired result, and $w^H(n)u(n)$ is the output of the equalizer filter, and $\mu$ is the update step size (0<$\mu$<1). The superscript H denotes the Hermitian transposition (i.e. the operation of vector transposition with complex conjugation). Each equalizer has its own set of coefficients which must be updated, and while operations to one set are described below, the procedures are applicable to both.

Figure 4:
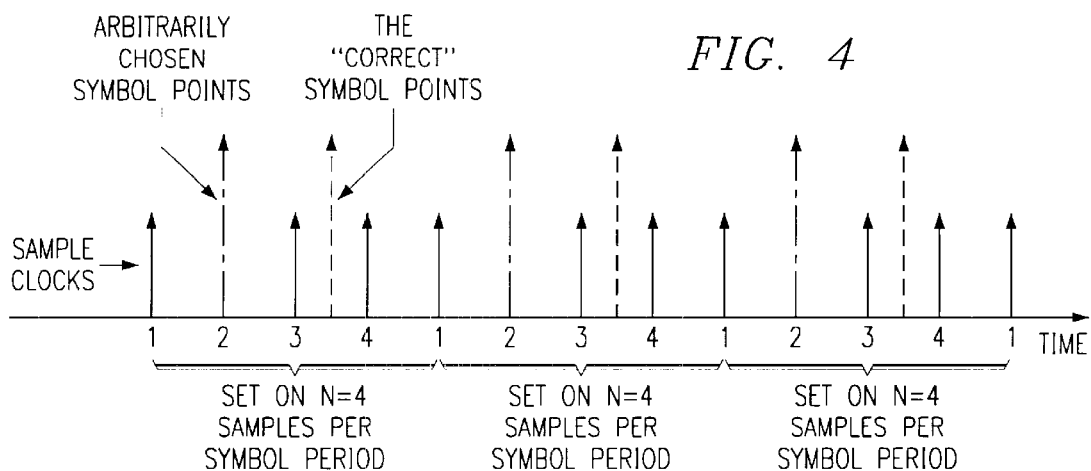
FIG. 4 is a graphical representation of a preamble with a chosen symbol point provided as an example.

The desired results d(n) are points of a QAM constellation. For a simple 4-QAM constellation, the two dimensional coordinates, (x,y), are (1,1), (-1,1), (-1,-1), and (1,-1). The desired results are then a sequence of 1's and -1's. During training, d(n) can be a sequence that is known to both the transmitter and receiver. In the QAM/CAP receiver being described, the two equalizers are trained and updated independently. The in-phase equalizer uses the x coordinate values as the desired results while the quadrature equalizer uses the y coordinate values as desired results. In the above equations, u(n) for the in-phase equalizer is represented as I(n), and u(n) for the quadrature equalizer is represented as Q(n). After a number of iterations, the estimation error should converge to some minimum value and the coefficients for the equalizers should converge to steady state values. An example of a converged equalizer with a set of 32 coefficients is shown in FIG. 4.

For updating the coefficients after training, the desired results d(n) are obtained from the outputs of the slicer 305. The slicer 305 selects the closest constellation point to the equalizer outputs.

Thus, in the 4-QAM example, if I(n) (the output of the in-phase equalizer) is 0.75, then the closest x coordinate, the sliced value, is 1 (0.75 is closest to 1 rather than -1). Therefore, the sliced value, I' (n)=1, is the d(n) to be used in the error equation. The error e(n) would then be $$e(n) = d(n) - w^H(n)u(n)$$
$$= I'(n) - I(n)$$
$$= 1 - 0.75$$
$$= 0.25$$

where I' (n) is the value of the slicer output and I(n) is the equalizer output.

In conventional QAM/CAP receivers, the adaptive equalizer is used to compensate for changes in channel characteristics. A previously stated, timing recovery is performed by a separate timing recovery block. However, because a fractionally space equalizer has the ability to incorporate a fractional delay into its impulse response, the adaptive fractionally space equalizer can be used as the timing recovery block as well as the channel compensation block.

When a receiver first detects the beginning of a burst message, a tracking system may not be used because the initial phase relationship between the transmitter and receiver clocks has not yet been determined. The present invention provides a method and a device for acquiring initial timing phase and for providing proper alignment of the equalizer.

Assuming that the transmission channel has no time varying aspect to it, the receiver equalizers need be trained only once, upon the application of power to the system. Succeeding message bursts can then acquire initial timing phase alignment and then track any subsequent timing drift. However, since the phase of the transmitter and receiver clocks will drift with respect to each other between message bursts, the phase difference between the clocks must be determined on a message burst to message burst basis.

Each message burst is composed of a preamble, comprised of a known sequence, followed by a data stream. The preamble is made up of an alternating sequence of CAP/QAM symbols that are 180° apart. One manner of designing a preamble which provides a known sequence is to use the two outer points of the CAP/QAM constellation. For example, the two outer constellation points, or I/Q pairs, correspond to [−7,−7] and [7,7] for a 16-QAM constellation. Thus, for a preamble of length N=64 for a 16-QAM modem, the burst preamble sequence can be (7,7), (−7,−7), (7,7), (−7,−7), etc., wherein 32 (7,7) symbols and 32 (−7,−7) symbols are interleaved.

The preamble section provides a known sequence which the receiving system uses to determine the phase relationship between the transmitter and receiver clocks. If the transmitter and receiver clocks were properly aligned, one out of every N equalizer outputs should equal one of the two outer points. When the clocks are aligned, the slicer, which operates at the symbol rate, uses this optimum equalizer output pair as its input, and thus allows the data to be decoded correctly. The position of this optimum equalizer pair within each subsequent set of N equalizer outputs can be referred to as the symbol point. Assume N=4 in the ongoing fractionally spaced example provided herein.

The preamble to be provided should be sufficiently long for the system to determine the phase alignment of the transmitter and receiver clocks. The length of the preamble depends upon the system characteristics, specifically the frequency of the signal and the speed at which the below described operations may be performed by a receiver.

A timing phase acquisition system according to the invention samples N consecutive outputs of the I and Q equalizers, where N is the number of samples per symbol. (4 in the example). As stated earlier, if the alignment were perfect, one of the N samples of I and Q equalizer output pairs would equal the correct constellation point. However, typically the pairs will not be aligned. The invention describes a method to compute and to implement efficiently a delay in the receiver such that the I/Q equalizer output pair, corresponding to the symbol point, is equal to the desired preamble symbol (such as (7,7) or (−7,−7) in the example).

A timing phase acquisition system according to the invention can be performed by the following steps. A device performing the invention can be implemented solely through hard-coded electronics or can utilize a computer and software for the digital signal processing, such as can by provided by the buffer management device.

During initialization, the system operates on N consecutive I and Q equalizer output pairs at a time. The system may perform several iterations to successfully acquire correct alignment. The N pairs used in succeeding iterations are preferably a multiple N samples apart. In the ongoing example, the first iteration uses $I_nQ_n, I_{n+1}Q_{n+1}, I_{n+2}Q_{n+2}, I_{n+3}Q_{n+3}$, where n=0. Further iterations of the method must use the pairs where n=j*N, where j represents the $j^{th}$ iteration.

At initialization, a variable dly, measured in degrees, is set to zero. The variable dly represents the initial phase delay present in the equalizer filters and is updated by successive iterations until the timing phase has been sufficiently matched.

The system selects one of the N equalizer output pairs as the pair designated as the symbol point. FIG. 4 is provided as an example of a preamble showing the chosen symbol point and the actual received symbol point in relation to sample sets. Later iterations will use this same symbol point. Once timing alignment is achieved, the equalizer outputs corresponding to this symbol point is fed to the receiver slicer for proper data decoding.

Assuming that the I and Q values correspond to a constellation point in 2 dimensional space, the point can be represented in polar notation by a magnitude and an angle. The system determines the angle and compares it with the angle of the desired constellation point. The angle is computed by taking the arctangent of Q/I, where I and Q are the outputs of the in-phase and quadrature equalizers corresponding to the selected symbol point. The angle, $\theta_{output}$ expressed in degrees, can be represented by the following formula:

$$\theta_{output} = \arctan(\mathrm{abs}(Q_{ouput}/I_{output})).$$

The system compares this angle with the desired angle corresponding to one of the preamble symbols. The desired angle, $\theta_{desired}$, expressed in degrees, can be represented by the following formula:

$$\theta_{desired} = \arctan(\mathrm{abs}(Q_{desired}/I_{desired})).$$

The desired angle, $\theta_{desired}$, depends upon the constellation points chosen for the preamble of the burst message. For example (for constellation points (7,7), (−7,−7), etc.), $\theta_{desired}=45°$. The difference from the desired angle and the angle of the I and Q values of the equalizer outputs can be determined by subtracting $\theta_{output}$ from $\theta_{desired}$. The phase difference, expressed in degrees, can be represented by a variable τ which can be set according to the following formula:

$$\tau = \theta_{desired} - \theta_{output} (\text{i.e.}, \tau = 45° - \theta_{output}).$$

From a practical point of view, the arctangent can be implemented using a lookup table method which can be incorporated into a memory buffer or software. The system can account for the loss of sign information by the operation of the absolute value function by changing the sign of τ, if τ is positive.

Once a value for τ has been obtained, the system can implement a fractional delay for the in-phase and quadrature equalizers such that their outputs at the symbol point is as close as possible to the desired preamble symbol constellation point. This delay, $dly_{new}$, which can be positive or negative, is expressed in degrees and may be represented by the following equation:

$$dly_{new} = \text{modulo } 90°(dly+\tau).$$

Since only a fractional delay (delays that are less than one sample period) can be implmented using digital filters, the modulo 90° function is used to keep the delay less than one sample period. Thus, in our example of N=4 samples per symbol, 90° corresponds to one sample period (360°/N). Where the modulo function operates to truncate the delay to a unit value, the delay may increment or deincrement by a unit according to the sign or necessary direction of correction.

Once a new delay value is obtained, the system inserts a fractional delay, t expressed in seconds, where:

$$t = T(dly_{new}/90°),$$

where T is equal to one sample period in seconds. For example, in FIG. 4, the chosen symbol point is incremented from 2 to 3.

To implement the new delay, $dly_{new}$, the system generates a temporary set of filter coefficients to create a delay filter, or impulse response corresponding to the amount of fractional delay. The delay filter coefficients are convolved with the impulse response of the original equalizer filters to generate new coefficients for both in-phase and quadrature equalizers. This pre-convolution operation eliminates the need for another filter in front of the equalizers. An alternative method of providing an additional equalizer in front of each of the in-phase and quadrature equalizers is equivalent but not as effective as combining the two equalizers. After the new equalizer coefficients are determined, N new equalizer output samples are computed and the above process is repeated.

It may take several iterations of the above steps for τ to be sufficiently close to zero to allow the device to operate effectively. For example, in FIG. 4, a second iteration would be required to add a fractional delay to shift the chosen symbol point from 3 to 3.5 to match the correct symbol point. Once τ is sufficiently close to zero, the modified coefficients of the equalizers will have accounted for the initial timing phase difference. Known methods may then be employed by the receiver during the data portion of the message burst to track the clock drift such that the slicer is decoding the data correctly.

Determining when τ is sufficiently close to zero is performed by testing if τ is less than a predefined threshold. Determining the optimum threshold depends upon system parameters, but need only be as accurate so as determine that if the I and Q equalizer outputs corresponding the chosen symbol point were to be sliced by the slicer, they would slice correctly to the desired preamble constellation point, and not to any other constellation point. In the QAM-16 case, the I and Q equalizer outputs at the symbol point should slice to either (7,7) or (−7,−7) and not to (7,5),(5,7),(−7,−5), or (−5,−7) for example. When τ converges to a value that is less than the threshold, then sufficient timing alignment has been achieved and the testing and adjusting iteration process can be ceased.

Depending on the quality of the channel and the effectiveness of the equalizer, there can exist ambiguity as to whether the symbol point chosen is the correct symbol point. Although the symbol point has been properly aligned, an additional test can be performed to confirm that the chosen symbol point is the correct symbol point. This additional test makes use of the I and Q equalizer output pairs before and after the chosen symbol point.

Figure 5:
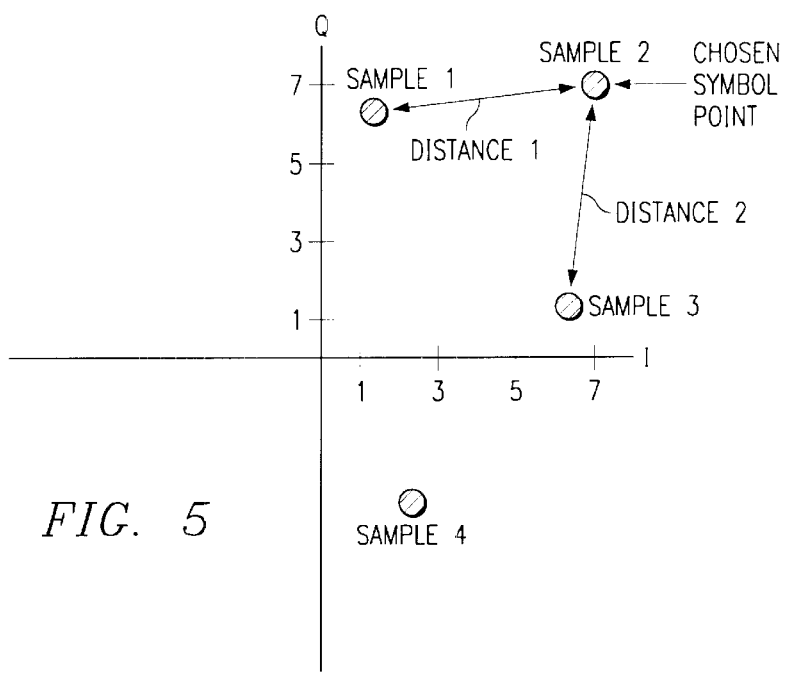
FIG. 5 is a graphical representation of constellation points provided as an example.

According to the additional test, the distance between the other symbols in the sample set and the pair corresponding to the chosen symbol point are computed and compared. FIG. 5 shows a graphical representation of this test according to the example shown in FIG. 4. These operations can be represented by the following equations, where the subscript 2 corresponds to the chosen symbol point and also represents the $2^{nd}$ equalizer output pair in a set of N pairs:

$$\text{Distance 1 } (D_1) = (I_1 - I_2)^2 + (Q_1 - Q_2)^2, \text{ and}$$

$$\text{Distance 2 } (D_2) = (I_3 - I_2)^2 + (Q_3 - Q_2)^2.$$

If the abs(DISTANCE 1–DISTANCE 2) is less than a distance threshold, then the chosen symbol point corresponding to the $I_2$ and $Q_2$ is the correct symbol point. However, if it is not less than the threshold, then a delay of one-half a sample period is added and the symbol point is incremented by 1. The new symbol point now corresponds to $I_3$ and $Q_3$, the $3^{rd}$ position of the set of N pairs. A new delay filter with the following fractional delay is generated where:

$$dly_{new} = \text{modulo } 90°(dly+45°).$$

Wherein, in our example of N=4 samples per symbol, 90° corresponds to one sample period (360°/N) In pseudo-code form the test can be represented as:

If $|D_1-D_2|<$ distance threshold, then the chosen symbol point is the correct symbol point for slicing, so start decoding data;

else set $dly_{new}$=Modulo 90°(dly+45°), compute a new delay filter, increment the symbol point by one, and start decoding data.

Wherein, in our example of N=4 samples per symbol, 45° corresponds to one sample period (360°/2N).

Determination of the distance threshold depends upon the characteristics of the system and need only be enough to distinguish the correct constellation point. The distances, $D_1$ and $D_2$ are squared values which need not be reduced to their square roots since they are merely being used for comparison purposes.

As mentioned above, once τ is sufficiently close to zero, and the equalizers have been modified to account for the timing phase difference between the transmitter and receiver, the new set of coefficients is ready for use for the current message burst. During message decoding, conventional methods to track any subsequent phase clock drift may be used. For each subsequent message burst, the phase acquisition method should be performed to obtain initial timing alignment between the transmitter and receiver clocks.

Although the invention has been described here by reference to specific embodiments thereof, such embodiments are susceptible of variation and modification without departing from the spirit and scope of the appended claims.

What is claimed is:

1. A method for determining timing phase of a digital signal and for initializing a receiver, comprising:

detecting a burst message preamble of the digital signal, choosing a desired symbol point, calculating a desired angle of the desired symbol point, sampling an output signal from an in-phase equalizer and a quadrature equalizer to form a subset of the preamble, choosing a selected output pair from the subset, calculating an output angle of the selected output pair, comparing the desired angle with the output angle to obtain an angle difference, and implementing a delay for the in-phase equalizer and quadrature equalizer based on the angle difference.

2. A method for determining timing phase according to claim 1, further comprising the step of:

performing a test for ambiguity comprised of:

determining a first distance between the selected output pair and a first adjacent in-phase and quadrature output pair, determining a second distance between the selected output pair and a second adjacent in-phase and quadrature output pair, calculating a distance difference, comparing the distance difference with a distance threshold;

implementing the delay for the in-phase equalizer and quadrature equalizer if the distance difference is less than the distance threshold;

calculating a new fractional delay if the distance difference is not less than the distance threshold; and implementing the new fractional delay for the in-phase equalizer and quadrature equalizer if the distance difference is not less than the distance threshold.

3. A method for determining timing phase according to claim 1, further comprising the steps of:

providing an iterative process comprising calculating an iteration output angle of the selected output pair, comparing the desired angle with the iteration output angle to obtain an iteration angle difference, calculating a fractional delay for a fractionally spaced in-phase equalizer and a fractionally spaced quadrature equalizer, completing the iterative process upon the testing of a threshold; and implementing the fractional delay for the fractionally spaced in-phase equalizer and the fractionally spaced quadrature equalizer.

4. A method for determining timing phase according to claim 1, further comprising the step of:

providing an iterative process comprising calculating an iteration output angle of the selected output pair, comparing the desired angle with the iteration output angle to obtain a difference, calculating a fractional delay for a fractionally spaced in-phase equalizer and a fractionally spaced quadrature equalizer, and completing the iterative process upon the testing of a threshold; and performing a test for ambiguity comprised of:

determining a first distance between the selected output pair and a first adjacent in-phase and quadrature output pair, determining a second distance between the selected output pair and a second adjacent in-phase and quadrature output pair, calculating a distance difference, comparing the distance difference with a distance threshold;

implementing the delay for the fractionally spaced in-phase equalizer and the fractionally spaced quadrature equalizer if the distance difference is less than the distance threshold;

calculating a new fractional delay if the distance difference is not less than the distance threshold; and implementing the new fractional delay for the fractionally spaced in-phase equalizer and fractionally spaced quadrature equalizer if the distance difference is not less than the distance threshold.

5. A timing phase acquisition and initialization device for determining timing phase of a digital signal and for initializing a receiver, comprising:

an equalizer for processing said digital signal, a filter buffer for storing a plurality of equalizer coefficients to be applied to said equalizer, and a buffer manager for detecting a burst message preamble of the digital, choosing a desired symbol point, calculating a desired angle of the desired symbol point, sampling an output signal from an in-phase equalizer and a quadrature equalizer to form a subset of the preamble, choosing a selected output pair from the subset, calculating an output angle of the selected output pair, comparing the desired angle with the output angle to obtain an angle difference, and implementing a delay for the in-phase equalizer and quadrature equalizer based on the angle difference.

* * * * *